Feb. 27, 1934.   F. BENDIX ET AL   1,948,978
TOASTER
Filed March 17, 1933   2 Sheets-Sheet 1
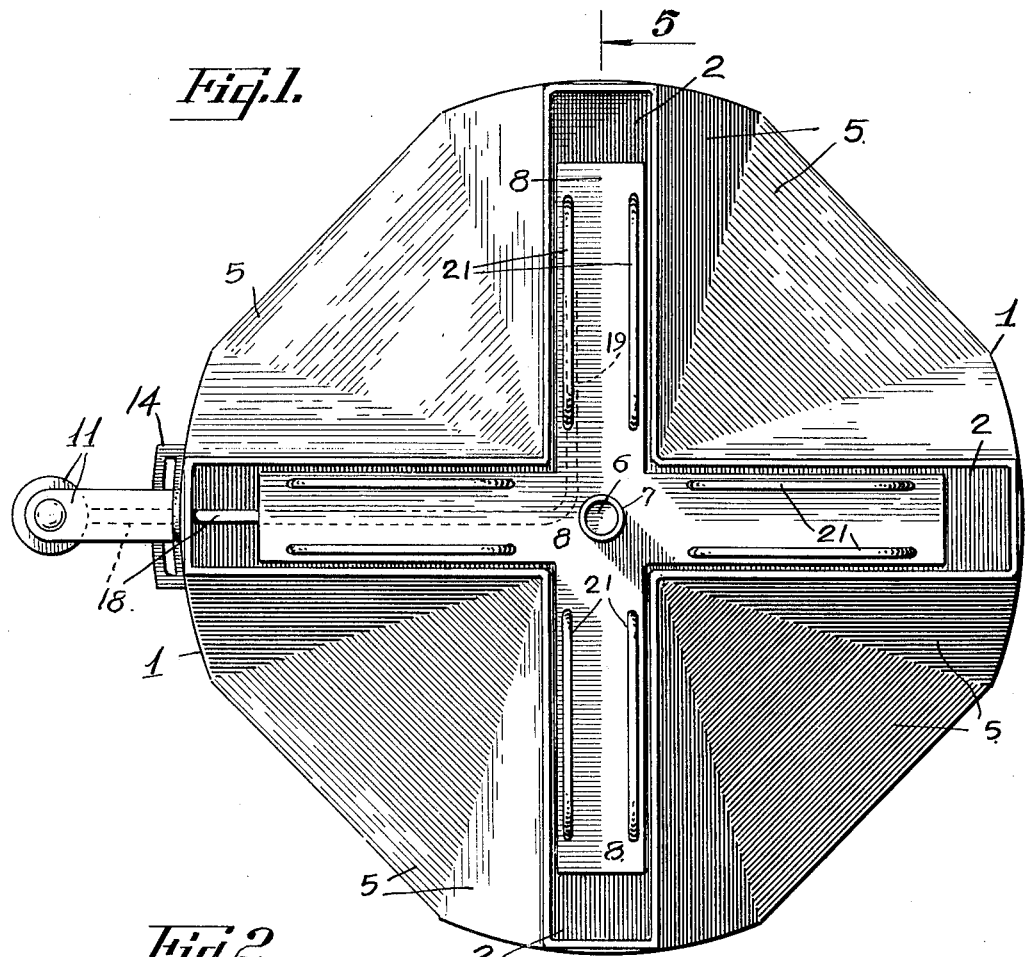
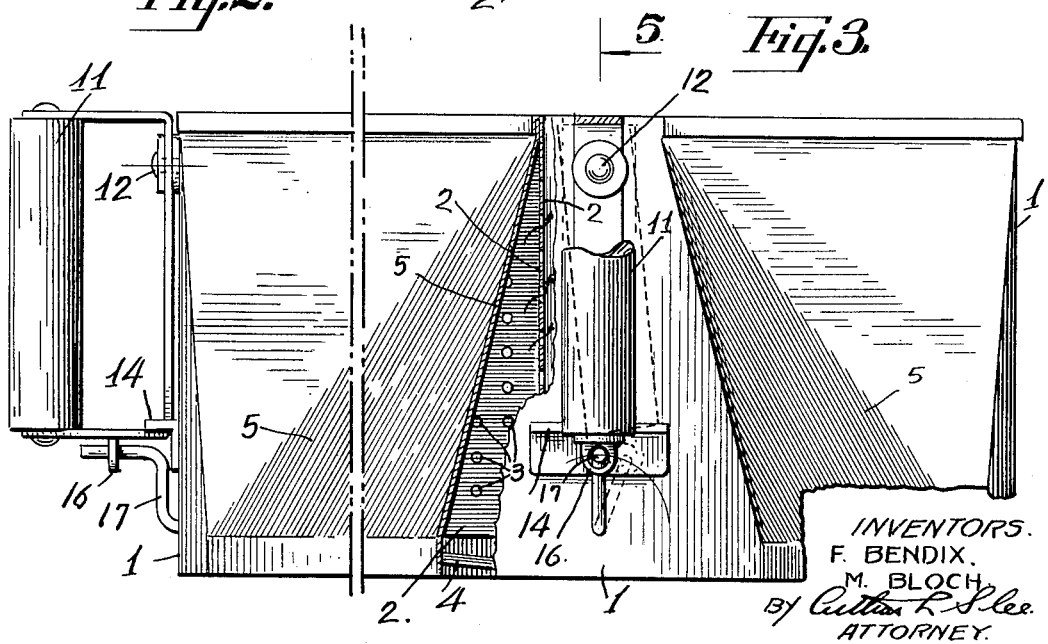
INVENTORS.
F. BENDIX,
M. BLOCH,
BY *Arthur R. S. Lee*
ATTORNEY.

Feb. 27, 1934.   F. BENDIX ET AL   1,948,978
TOASTER
Filed March 17, 1933   2 Sheets-Sheet 2

INVENTORS
F. BENDIX.
M. BLOCH.
By Arthur L. Slee
ATTORNEY.

Patented Feb. 27, 1934

1,948,978

UNITED STATES PATENT OFFICE 1,948,978

TOASTER

Frederick Bendix and Max Bloch, San Francisco, Calif.

Application March 17, 1933. Serial No. 661,244

14 Claims. (Cl. 53—5)

Our invention relates to toasters for toasting bread and the like, wherein a cruciate hollow member with evenly perforated side walls is provided for holding a plurality of pieces of bread to be toasted in substantially radial positions relatively to each other whereby both sides of said bread may be uniformly exposed to a source of heat, said hollow member operating in conjunction with a housing having an open bottom and side walls converging upon and attached to the top of said member to direct heat passing through said open bottom uniformly through said perforated walls and onto bread to be toasted therein; provision also being made for raising or projecting the toasted bread above the top of said hollow member, to facilitate removal of said toast from the toaster.

The primary object of the present invention is to provide a new and improved toaster in which a plurality of pieces of bread are spaced radially whereby both sides thereof may be exposed to the action of applied heat.

Another object of the invention is to provide improved means for uniformly spreading heat simultaneously to both sides of a plurality of pieces of bread whereby they may be uniformly toasted.

A further object is to provide a cruciate hollow member open at the top thereof with perforate sides and supported slightly above and out of contact with a source of heat by a housing having a substantially large open bottom and having its walls converging upwardly and joined to the top of the hollow member whereby the passage of heat from a suitable source and into said member may be uniformly distributed, within said cruciate member.

A still further object is to provide a toaster of the character set forth having improved means for holding bread to be toasted in spaced relation to the walls of the toaster to permit a uniform passage of heat around said bread and also to prevent a contact of said bread with said walls to prevent burning or scorching of said toast.

A further object of the present invention is to provide an improved toaster having improved means for projecting the toasted bread above the top of the toaster to facilitate removal of said toast from the toaster.

We accomplish these and other objects by means of the improved device disclosed in the drawings forming a part of the present application wherein like characters of reference are used to designate similar parts throughout the specification and drawings, and in which—

Fig. 1 is a plan view of our improved toaster;

Fig. 2 is a partial elevation of Fig. 1;

Fig. 3 is also a partial elevation of Fig. 1, partly broken, and disclosing a front elevation of the handle, said Fig. 3 combining with Fig. 2, when the handle in Fig. 3 is removed, to make a complete elevation of Fig. 1;

Figure 4:
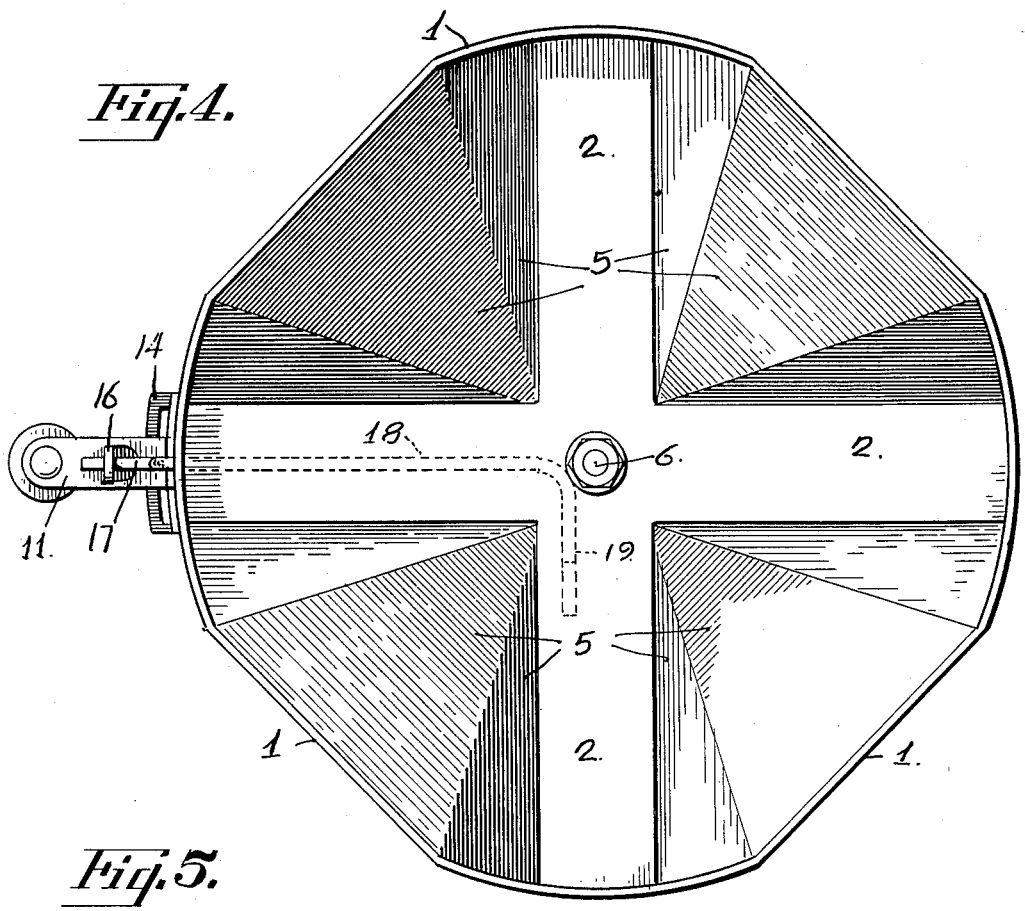
Fig. 4 is a bottom plan view of Fig. 1.
Figure 5:
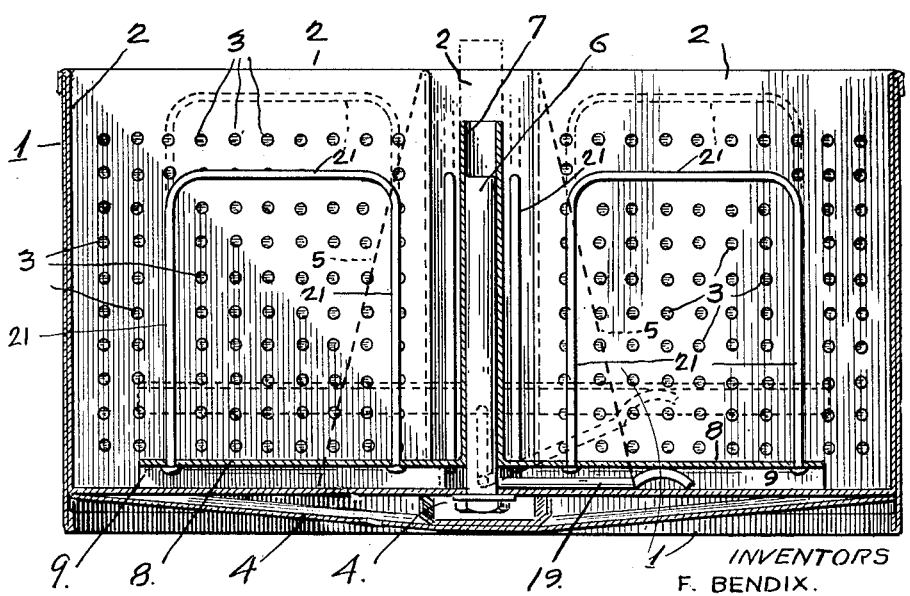
Fig. 5 is a vertical sectional view taken on line 5—5 of Fig. 1 in the direction indicated.

Referring to the drawings, the numeral 1 is used to designate a housing open at the bottom thereof, said housing being approximately circular or octagonal, as shown, and having the side walls 5 thereof converging upwardly to a cruciate form or shape and engaging the top of a hollow cruciate member 2, said member 2 being closed at the bottom and open at the top thereof and having its side walls provided with uniformly spaced apertures 3, as disclosed in Fig. 5 of the drawings, the purpose of which will hereinafter be more fully set forth.

The housing 1 supports the bottom of the cruciate hollow member 2 slightly above the bottom of the housing 1, as disclosed in Fig. 5 of the drawings, in order to prevent contact of the bottom of said cruciate member 2 with a source of heat, not shown, upon which the toaster may be placed when operating, thereby providing for a uniform passage of heat around and under said hollow member 2. As a further means of preventing direct contact of the bottom of said member 2 with a source of heat we have provided a false bottom 4 which is also preferably cruciform.

Within the approximate center of the cruciate hollow member 2, we have provided a rod or bolt 6 upon which is slidably mounted for vertical movement a sleeve 7 of a cruciform holder 8, as disclosed in Figs. 1 and 5 of the drawings. The holder 8 is held in spaced relation above the bottom of the hollow member 2 by means of downwardly extending flanges 9 so that close contact between the two elements will be prevented and burning or scorching of toast or bread being toasted upon said member or holder 8 will be prevented.

A suitable handle 11 is pivotally mounted at its upper end, as at 12, to one side of the housing 1 while the lower end of said handle 11 is slidably mounted within a limiting guide 14. An apertured lug 16 on the lower end of said handle 11 loosely engages an exterior crank portion 17 of a rod or shaft 18 mounted within one arm of the cruciate member 2, said shaft 18 extending under one arm of the holder 8 and having a lateral extension 19 engaging the under portion of another arm of the holder 8, as disclosed in dotted lines in Fig. 1, and in full lines in Fig. 5 of the drawings.

The holder 8 is also provided with a pair of spaced guards or wires 21 on each arm thereof to hold bread being toasted upon said holder in spaced relation to the adjacent perforate walls of the hollow cruciate member 2, as disclosed in Figs. 1 and 5 of the drawings, in order to prevent contact, of bread being toasted, with said walls, and consequent burning of said toast, and also to prevent retardation of a free circulation of heat through said apertured walls and around said toast.

In operation, by means of the handle 11, the housing 1, with its open bottom and cruciate hollow member 2 therein, is placed over any suitable source of heat, not shown. The heat enters the open bottom of said housing 1 and the converging walls 5 of said housing direct said heat through the apertures 3 of the side walls or cruciate member 2 and directly around the bread, not shown, being toasted. The slices of bread to be toasted are placed upon each arm of the cruciform holder 8 and within each radial compartment of the hollow cruciate member 2 so that both sides of a plurality of slices of bread may be evenly exposed to the action of heat. The slices are also placed between the guards 21 and thereby held in spaced relation to the adjacent apertured walls of the member 2 to prevent a contact which might tend to burn or scorch said toast and also to permit a free circulation of heat around all sides of said bread so that the same might be uniformly and evenly toasted.

When the bread has been sufficiently toasted, the lower portion of the handle 11 is moved to actuate the crank 17 of the shaft 18 and raise the lateral extension 19 thereof, which will in turn raise the holder 8 and project the upper ends of the toast above the top of the device to facilitate removal of said toast and prevent further toasting, burning or scorching thereof. Or, inasmuch as the holder is freely and removably slidable upon the rod 6, the entire holder 8 may be removed from the hollow member 2 and the toast will be retained thereon by means of the guards 21.

It should be noted that not only is the bread being subjected to the action of applied heat uniformly, but that a sufficient space is maintained between the bottom of the toast holder 8 and the cruciate hollow member 2 so that all danger of burning or scorching the toast is eliminated. To further prevent burning of the toast the false cruciform bottoms 4 are supplied so that there can be no direct contact of heat with the bottom of said member 2.

Having thus described our invention, what we claim as new and desire to secure by Letters Patent is—

1. A toaster comprising a hollow member open at the top and having radial compartments with perforate side walls; and a housing supporting said hollow member and having an open bottom and converging walls engaging the top of said hollow member and closing the top of said housing whereby heat entering said open bottom may be directed by said converging walls through the perforate sides of said hollow member to evenly and uniformly toast bread therein.

2. A toaster comprising a hollow member open at the top and having radial compartments with perforate side walls; a housing supporting said hollow member and having an open bottom and converging walls engaging the top of said hollow member and closing the top of said housing whereby heat entering said open bottom may be directed by said converging walls through the perforate sides of said hollow member to evenly and uniformly toast bread therein; and a holder slidably mounted for vertical movement within said radial compartments and spaced above the bottom thereof to prevent contact of said toast with said bottom to prevent burning of said toast, and to facilitate removal of said toast from said compartments.

3. A toaster comprising a hollow member open at the top and having radial compartments with perforate side walls; a housing supporting said hollow member and having an open bottom and converging walls engaging the top of said hollow member and closing the top of said housing whereby heat entering said open bottom may be directed by said converging walls through the perforate sides of said hollow member to evenly and uniformly toast bread therein; a holder slidably mounted for vertical movement within said radial compartments and spaced above the bottom thereof to prevent contact of said toast with said bottom to prevent burning of said toast, and to facilitate removal of said toast from said compartments; and means for holding toast within said compartments in spaced relation to the walls thereof.

4. A toaster comprising a hollow member open at the top and having radial compartments with perforate side walls; a housing supporting said hollow member and having an open bottom and converging walls engaging the top of said hollow member and closing the top of said housing whereby heat entering said open bottom may be directed by said converging walls through the perforate sides of said hollow member to evenly and uniformly toast bread therein; a holder slidably mounted for vertical movement within said radial compartments and spaced above the bottom thereof to prevent contact of said toast with said bottom to prevent burning of said toast, and to facilitate removal of said toast from said compartments; and means mounted upon said holder for preventing contact of toast upon said holder in spaced relation to the walls of said compartments.

5. A toaster comprising a hollow member open at the top and having radial compartments with perforate side walls; a housing supporting said hollow member and having an open bottom and converging walls engaging the top of said hollow member and closing the top of said housing whereby heat entering said open bottom may be directed by said converging walls through the perforate sides of said hollow member to evenly and uniformly toast bread therein; a holder slidably mounted for vertical movement within said radial compartments and spaced above the bottom thereof to prevent contact of said toast with said bottom to prevent burning of said toast, and to facilitate removal of said toast from said compartments; means mounted upon said holder for preventing contact of toast upon said holder in spaced relation to the walls of said compartments; and means for raising said holder and toast thereon above the top of said hollow member to facilitate removal of toast therefrom.

6. A toaster comprising a hollow member open at the top and having radial compartments with perforate side walls; a housing supporting said hollow member and having an open bottom and converging walls engaging the top of said hollow member and closing the top of said housing whereby heat entering said open bottom may be directed by said converging walls through the perforate sides of said hollow member to evenly and uniformly toast bread therein; a holder slidably mounted for vertical movement within said radial compartments and spaced above the bottom thereof to prevent contact of said toast with said bottom to prevent burning of said toast, and to facilitate removal of said toast from said compartments; means mounted upon said holder for preventing contact of toast upon said holder in spaced relation to the walls of said compartments; means for raising said holder and toast thereon above the top of said hollow member to facilitate removal of toast therefrom; a handle pivotally mounted upon the outer side of the housing to facilitate handling of said housing; and means actuated by movement of said handle for raising said holder above the top of said hollow member to facilitate the removal of toast from said holder and hollow member.

7. A toaster for bread and the like comprising a hollow cruciate member open at the top thereof and having perforate side walls to permit a uniform passage of heat into said member; and a cruciate holder slidably mounted for vertical movement within said hollow member and provided with downwardly extending flanges to hold the same in spaced relation from the bottom of the hollow member to prevent burning of toast placed upon said holder.

8. A toaster for bread and the like comprising a hollow cruciate member open at the top thereof and having perforate side walls to permit a uniform passage of heat into said member; a cruciate holder slidably mounted for vertical movement within said hollow member and provided with downwardly extending flanges to hold the same in spaced relation from the bottom of the hollow member to prevent burning of toast placed upon said holder; and means for raising said holder to project toast thereon above the top of said hollow member to facilitate the removal of toast therefrom.

9. A toaster comprising a hollow cruciate member open at the top and closed at the bottom thereof and having the side walls thereof provided with uniformly spaced apertures to permit a uniform passage and distribution of heat into said member; a housing having a relatively large open bottom and having the walls thereof converging to and engaging the top of the cruciate member whereby heat entering the bottom of said housing may be uniformly directed by said converging walls and apertures of the side walls into the cruciate member to toast bread therein, the bottom of said cruciate member being supported by the housing above the bottom of said housing to prevent contact of said cruciate bottom with a source of heat on which said housing is placed; and a false cruciate bottom mounted within said housing and below the bottom of the cruciate hollow member to prevent contact of a heating element, on which the toaster is placed, with the bottom of said cruciate hollow member.

10. A toaster comprising a hollow cruciate member open at the top and closed at the bottom thereof and having the side walls thereof provided with uniformly spaced apertures to permit a uniform passage and distribution of heat into said member; a housing having a relatively large open bottom and having the walls thereof converging to and engaging the top of the cruciate member whereby heat entering the bottom of said housing may be uniformly directed by said converging walls and apertures of the side walls into the cruciate member to toast bread therein, the bottom of said cruciate member being supported by the housing above the bottom of said housing to prevent contact of said cruciate bottom with a source of heat on which said housing is placed; a false cruciate bottom mounted within said housing and below the bottom of the cruciate hollow member to prevent contact of a heating element, on which the toaster is placed, with the bottom of said cruciate hollow member; and means for holding toast within said hollow cruciate member in spaced relation with the perforate walls thereof to prevent burning toast within said hollow member.

11. A toaster comprising a hollow cruciate member open at the top and closed at the bottom thereof and having the side walls thereof provided with uniformly spaced apertures to permit a uniform passage and distribution of heat into said member; a housing having a relatively large open bottom and having the walls thereof converging to and engaging the top of the cruciate member whereby heat entering the bottom of said housing may be uniformly directed by said converging walls and apertures of the side walls into the cruciate member to toast bread therein, the bottom of said cruciate member being supported by the housing above the bottom of said housing to prevent contact of said cruciate bottom with a source of heat on which said housing is placed; a false cruciate bottom mounted within said housing and below the bottom of the cruciate hollow member to prevent contact of a heating element, on which the toaster is placed, with the bottom of said cruciate hollow member; and means for holding toast within said hollow cruciate member in spaced relation with the perforate walls thereof to prevent burning toast within said hollow member; and means for projecting toast above the top of said member and housing to facilitate removal thereof.

12. A toaster comprising a hollow cruciate member open at the top and closed at the bottom thereof and having the side walls thereof provided with uniformly spaced apertures to permit a uniform passage and distribution of heat into said member; a housing having a relatively large open bottom and having the walls thereof converging to and engaging the top of the cruciate member whereby heat entering the bottom of said housing may be uniformly directed by said converging walls and apertures of the side walls into the cruciate member to toast bread therein, the bottom of said cruciate member being supported by the housing above the bottom of said housing to prevent contact of said cruciate bottom with a source of heat on which said housing is placed; a false cruciate bottom mounted within said housing and below the bottom of the cruciate hollow member to prevent contact of a heating element, on which the toaster is placed, with the bottom of said cruciate hollow member; means for holding toast within said hollow cruciate member in spaced relation with the perforate walls thereof to prevent burning toast within said hollow member; a holder slidably mounted for vertical movement within the hollow cruciate member; means mounted upon said holder for holding bread therein to be toasted in spaced relation to the perforate walls of said member to prevent burning of said toast.

13. A toaster comprising a hollow cruciate member open at the top and closed at the bottom thereof and having the side walls thereof provided with uniformly spaced apertures to permit a uniform passage and distribution of heat into said member; a housing having a relatively large open bottom and having the walls thereof converging to and engaging the top of the cruciate member whereby heat entering the bottom of said housing may be uniformly directed by said converging walls and apertures of the side walls into the cruciate member to toast bread therein, the bottom of said cruciate member being supported by the housing above the bottom of said housing to prevent contact of said cruciate bottom with a source of heat on which said housing is placed; a false cruciate bottom mounted within said housing and below the bottom of the cruciate hollow member to prevent contact of a heating element, on which the toaster is placed, with the bottom of said cruciate hollow member; means for holding toast within said hollow cruciate member in spaced relation with the perforate walls thereof to prevent burning toast within said hollow member; a holder slidably mounted for vertical movement within the hollow cruciate member; means mounted upon said holder for holding bread therein to be toasted in spaced relation to the perforate walls of said member to prevent burning of said toast; and means for raising said holder within said hollow member to project toast above the upper edge of said toaster to facilitate removal thereof.

14. A toaster comprising a hollow cruciate member open at the top and closed at the bottom thereof and having the side walls thereof provided with uniformly spaced apertures to permit a uniform passage and distribution of heat into said member; a housing having a relatively large open bottom and having the walls thereof converging to and engaging the top of the cruciate member whereby heat entering the bottom of said housing may be uniformly directed by said converging walls and apertures of the side walls into the cruciate member to toast bread therein, the bottom of said cruciate member being supported by the housing above the bottom of said housing to prevent contact of said cruciate bottom with a source of heat on which said housing is placed; a false cruciate bottom mounted within said housing and below the bottom of the cruciate hollow member to prevent contact of a heating element, on which the toaster is placed, with the bottom of said cruciate hollow member; means for holding toast within said hollow cruciate member in spaced relation with the perforate walls thereof to prevent burning toast within said hollow member; a holder slidably mounted for vertical movement within the hollow cruciate member; means mounted upon said holder for holding bread therein to be toasted in spaced relation to the perforate walls of said member to prevent burning of said toast; means for raising said holder within said hollow member to project toast above the upper edge of said toaster to facilitate removal thereof; a handle pivotally mounted upon said housing to facilitate placing and removal of said toaster; and means actuated by movement of said handle for raising said holder within the hollow cruciate member to project toast within said holder above the top of said toaster to facilitate removal of toast from said toaster.

FREDERICK BENDIX.
MAX BLOCH.